United States Patent [19]
Ishida et al.

[11] Patent Number: 5,355,071
[45] Date of Patent: Oct. 11, 1994

[54] POWER SOURCE APPARATUS FOR VEHICLES

[75] Inventors: Hideo Ishida, Nagoya; Toshitaka Tanahashi, Okazaki; Keiichiro Banzai, Toyota, all of Japan

[73] Assignee: Nippondenso Co., Ltd., Kariya, Japan

[21] Appl. No.: 871,230

[22] Filed: Apr. 20, 1992

[30] Foreign Application Priority Data

Apr. 24, 1991 [JP] Japan ................. 3-094102

[51] Int. Cl.$^5$ .............................................. H02J 7/14
[52] U.S. Cl. ............................................ 320/6; 320/17
[58] Field of Search ................. 320/5, 6, 7, 8, 15, 320/16, 17, 57, 61, 64; 322/89, 90, 94

[56] References Cited

U.S. PATENT DOCUMENTS

| | | | |
|---|---|---|---|
| 4,090,122 | 5/1978 | Hoinski | 320/6 |
| 4,491,779 | 1/1985 | Campbell | 320/6 |
| 4,748,395 | 5/1988 | Reynolds | 320/17 |
| 4,816,736 | 3/1989 | Dougherty et al. | 320/17 |
| 4,963,813 | 10/1990 | Bolle | 320/17 |

FOREIGN PATENT DOCUMENTS

| | | |
|---|---|---|
| 0162030 | 5/1985 | European Pat. Off. . |
| 0282033 | 3/1988 | European Pat. Off. . |
| 0372819 | 11/1989 | European Pat. Off. . |
| 48-31364 | 9/1973 | Japan . |
| 48-73733 | 10/1973 | Japan . |
| 49-95158 | 9/1974 | Japan . |
| 51-130833 | 11/1976 | Japan . |
| 1234023 | 9/1989 | Japan . |
| 1308133 | 12/1989 | Japan . |
| 9105395 | 4/1991 | PCT Int'l Appl. . |
| 1151694 | 8/1966 | United Kingdom . |
| 1154567 | 10/1966 | United Kingdom . |

*Primary Examiner*—Kristine L. Peckman
*Attorney, Agent, or Firm*—Cushman Darby & Cushman

[57] ABSTRACT

A power source apparatus for vehicles comprises first and second switch means respectively for controlling charging currents flowing from a rectifier of a generator to first and second batteries having equal open terminal voltages, and third switch means for controlling a current flowing through a field winding of the generator. The third switch means is controlled to be turned on/off in response to whichever of the voltages generated respectively by the first and second batteries is lower. The first and second switch means are controlled to be turned on/off on the basis of a duty factor set based on a voltage difference between the first and second batteries. When the voltage of the first battery becomes equal to or less than a predetermined voltage, that voltage being the lowest voltage that a starter motor needs to satisfactorily start an engine, the duty factor of the first switch means is made larger to charge the first battery with priority irrespective of whether the voltage of the first battery is larger than the voltage of the second battery or not.

4 Claims, 5 Drawing Sheets

(a) ON-DUTY ($D_1$) OF FIRST SWITCH MEANS 61

(b) ON-DUTY ($D_2$) OF SECOND SWITCH MEANS 62

POWER SOURCE APPARATUS FOR VEHICLES

BACKGROUND OF THE INVENTION

1. Field of the Invention

The present invention relates to a power source apparatus for vehicles having a first battery for supplying a current to a load of a start-up system and a second battery for supplying a current to a load of a non-start-up system and, in particular, to a power source apparatus capable of maintaining the first battery in a satisfactorily charged condition so that an engine may be started smoothly.

2. Description of the Related Art

Conventionally, a power source apparatus has a single three-phase alternating current generator and a single battery. An alternating current generated by the alternating current generator is rectified by a three-phase full-wave rectifier to produce a direct current output. "Alternating current" and "direct current" will be abbreviated hereinafter as "a.c." and "d.c.", respectively. The battery is charged by this direct current and supplies a current to the load of a start-up system, such as a starter motor, and other loads of a non-start-up system connected in parallel with the battery.

In the above-described conventional power source apparatus for vehicles, however, the battery runs out of electricity where a large current is dissipated carelessly when the engine is not in operation or where a current continues to be supplied from the battery to the electric load when electric generation of the a.c. generator is insufficient, for example when involved in a traffic jam. A problem occurs if the engine is not running or stops running and the battery has run out of electricity because the engine cannot be restarted.

SUMMARY OF THE INVENTION

An object of the present invention is to provide a power source apparatus capable of starting an engine smoothly by providing a battery for driving the load of a start-up system, such as a starter motor, and a battery for driving other loads of the non-start-up system and by maintaining the battery which is used for driving the load of the start-up system always in a charged state.

In order to achieve the above-described object, the vehicle power source apparatus of the present invention is constructed as described below.

The power source apparatus comprises first and second batteries, first switch means for controlling a current flowing from a rectifying means of an a.c. generator to the first battery, and second switch means for controlling a current flowing from the rectifying means to the second battery. According to the voltages of the first and second batteries, the value of a current flowing through a field winding of the a.c. generator is controlled to adjust the output of the a.c. generator. At the same time, the duty factors of the above-described first and second switch means are controlled according to the voltage drop values of the first and second batteries to adjust the charging currents supplied to the first and second batteries.

In the case where an a.c. generator of the permanent magnet type is used as the generator, conduction and cutoff of the first and second switch means are switched according to the voltage drop values of the first and second batteries and are controlled so as to supply a charging current alternately to the first and second batteries.

The first battery is a battery of a start-up system used for driving a starter motor. When the voltage of the first battery is lower than a second predetermined voltage, the first battery is charged.

The open terminal voltages of the first and second batteries are equal to each other. Voltages of the first and second batteries are compared with each other, and except when the voltage of the first battery is lower than the second predetermined voltage, the battery having a lower voltage is charged. Where a permanent magnetic type a.c. generator is not used, a current is caused to flow through the field winding of the generator so that a lower one of voltages of the first and second batteries may be kept at a first predetermined voltage which is higher than the second predetermined voltage.

Both the first and second switch means are cut off when voltages of both the first and second batteries exceed an upper limit voltage which is higher than the first predetermined voltage.

In the power source apparatus having the above-described configuration, the energy generated by the generator is increased or decreased according to the voltages of the first and second batteries, and the conduction states of the first and second switch means are controlled according to voltage drop values of the first and second batteries.

In a case where the voltage of the first battery supplying a current to the load of the start-up system is lower than the second predetermined voltage, a large charging current is supplied to the first battery, even if the voltage drop value of the second battery is larger than the voltage drop value of the first battery.

DESCRIPTION OF THE PREFERRED EMBODIMENTS

A power source apparatus for vehicles according to the present invention will hereinafter be described by referring to embodiments shown in FIGS. 1 to 7.

Figure 1:
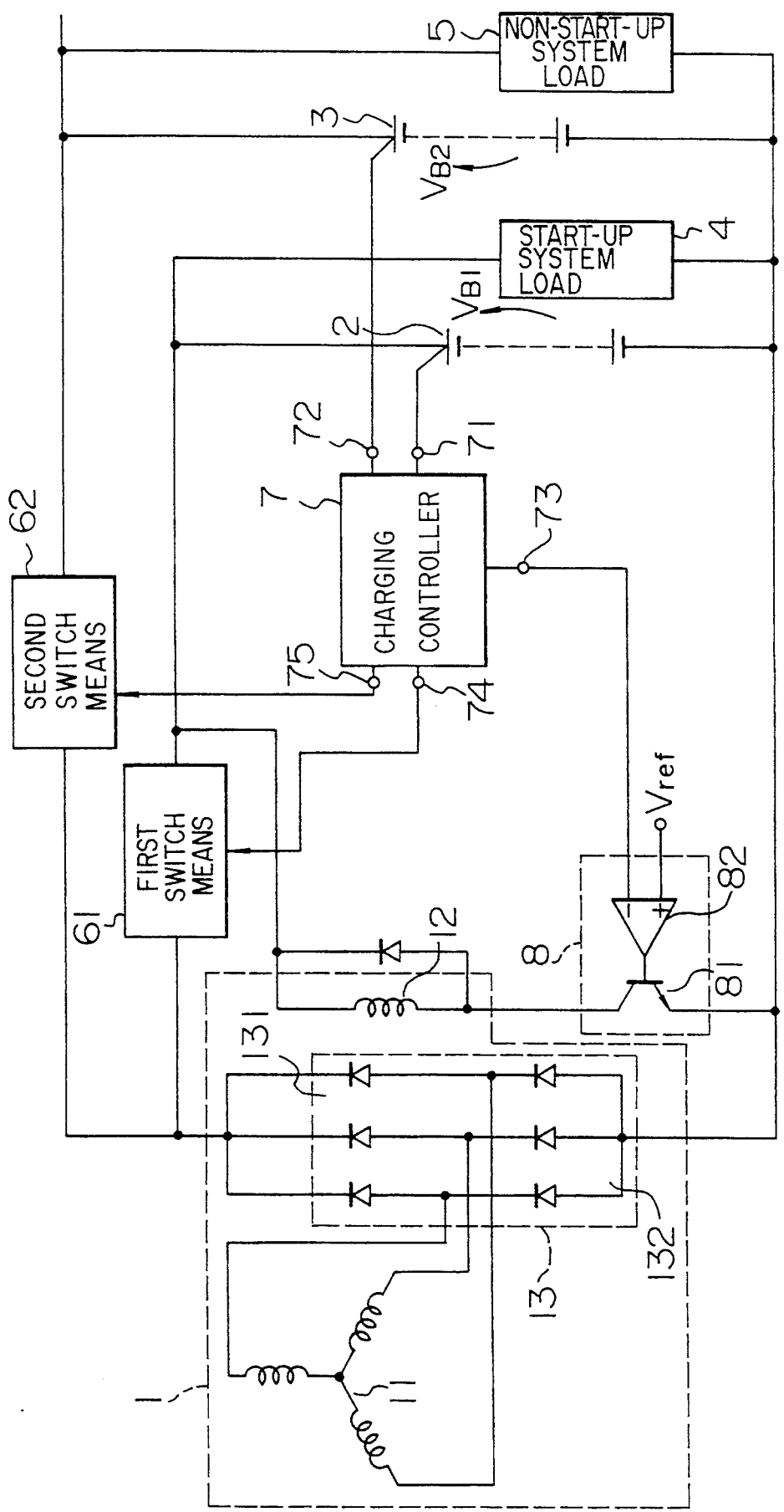
FIG. 1 is an overall configuration diagram showing a first embodiment of a power source apparatus for vehicles according to the present invention.

In FIG. 1, which shows a first embodiment of the invention numeral 1 denotes a three-phase a.c. generator for vehicles. This a.c. generator 1 has an armature winding 11, a field winding 12 and a rectifier set 13. The rectifier set 13 includes a lower level diode bridge 132 having anodes connected in common and a higher level diode bridge 131 having cathodes connected in common.

Numeral 2 denotes a first battery, and numeral 3 denotes a second battery. The open terminal voltage of the first battery is equal to that of the second battery, and they are set to 12 V, for example. The first battery 2 is connected to a load 4 of a start-up system such as a starter motor, a microcomputer for engine control, and an ignition device. The second battery 3 is connected to a load 5 of a non-start-up system such as an air conditioner and an electric blower.

Numeral 61 denotes first switch means, and numeral 62 denotes second switch means. Semiconductor power devices having control terminals, such as thyristors or power MOSFETs, are used as the first and second switch means 61 and 62. The first switch means 61 is connected between the cathode of the higher level diode bridge 131 and the first battery 2 to control a current flowing from the a.c. generator 1 to the first battery 2. The second switch means 62 is connected between the cathode of the higher level diode bridge 131 and the second battery 3 to control a current flowing from the a.c. generator 1 to the second battery 3.

In a case where power MOSFETs are used, parasitic diodes with their forward direction being same as the discharge current direction of the battery are formed, and hence reverse current preventing diodes each of which has a forward direction reverse to that of the forward direction of the parasitic diodes must be provided.

Numeral 7 denotes a charging controller. When an IG switch (ignition switch) which is not illustrated is closed, a current is supplied from the first battery 2 to the charging controller 7 to energize the charging controller 7. This charging controller 7 has first and second voltage input terminals 71 and 72 for inputting voltages $V_{B1}$ and $V_{B2}$ of the first battery 2 and the second battery 3, respectively, a low voltage value output terminal 73 for outputting a lower one of the voltages $V_{B1}$ and $V_{B2}$ of the first battery 2 and the second battery 3, respectively, and first and second switch control terminals 74 and 75 for outputting control signals to perform ON/OFF control of the first switch means 61 and the second switch means 62, respectively.

Power generation control means 8 includes third switch means 81 and a comparator 82. The inversion input terminal of this comparator 82 is connected to the low voltage value output terminal 73 of the charging controller 7. A first predetermined voltage Vref higher than a lower limit voltage $V_{AL}$ is inputted to the non-inversion input terminal of the comparator 82. When the output voltage of the low voltage output terminal 73 is lower than the first predetermined voltage Vref, the comparator 82 outputs a Hi signal to make third switch means 81 conductive. That is to say, a current can flow through the field winding 12 of the a.c. generator 1 when a lower one of the voltage $V_{B1}$ of the first battery 2 and the voltage $V_{B2}$ of the second battery 3 is lower than the first predetermined voltage Vref.

Figure 2:
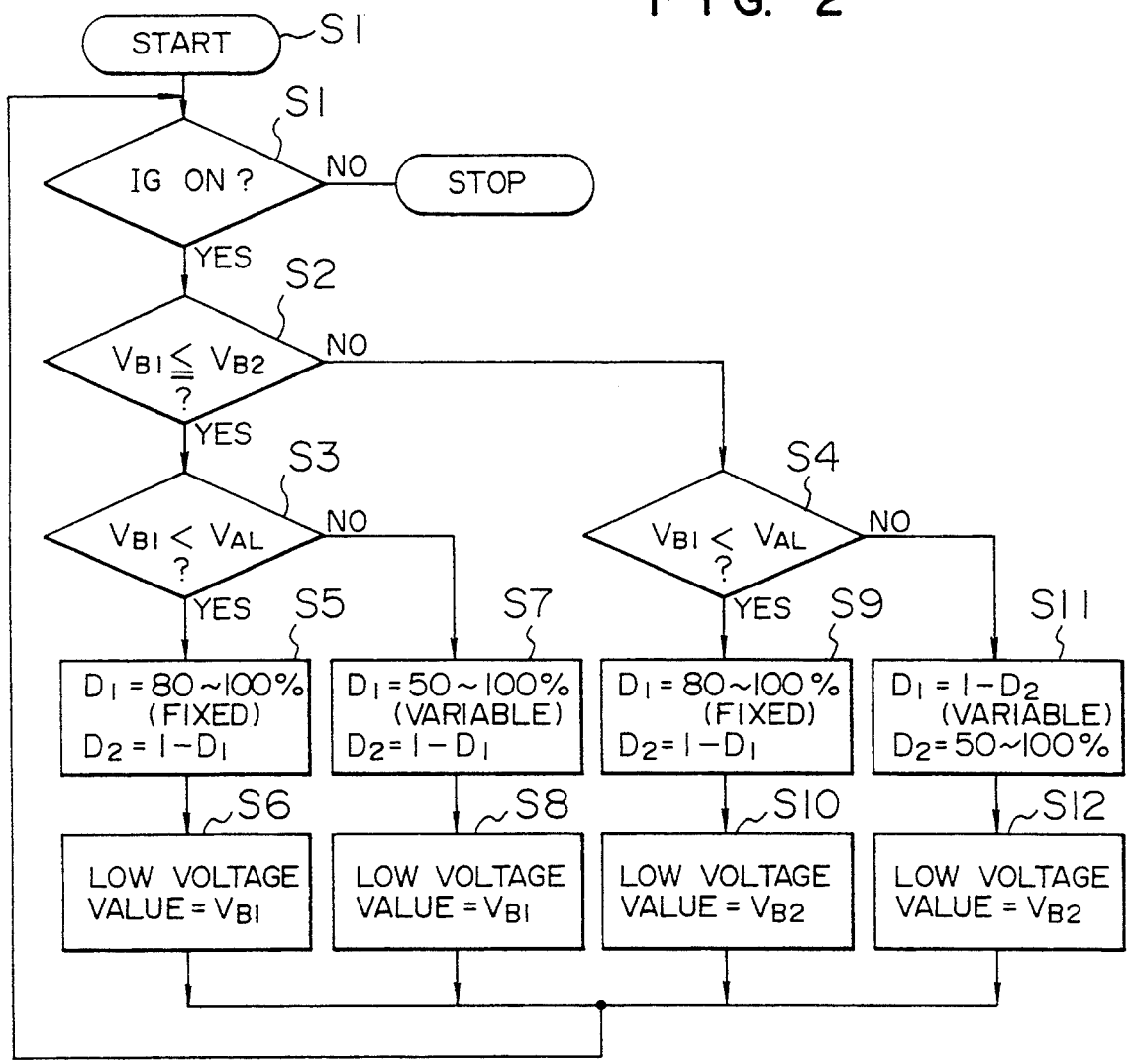
FIG. 2 is a flow chart showing the processing conducted by charging controller 7 in the above-described embodiment.

FIG. 2 is a flow chart showing an example of a control operation exercised by the above-described charging controller 7. Operation of the apparatus of the present embodiment will hereinafter be described by referring to this flow chart.

If it is decided at step S1 that the IG switch has been closed, the voltages $V_{B1}$ and $V_{B2}$ of the first battery 2 and the second battery 3, inputted from the first voltage input terminal 71 and the second voltage input terminal 72 of the charging controller 7, respectively, are compared with each other, and a decision is made based on the result of this comparison at step S2. If $V_{B1} \leq V_{B1}$, the voltage $V_{B1}$ of the first battery 2 is compared with a second predetermined voltage (hereinafter referred to as "lower limit voltage") $V_{AL}$ and a decision is made based on a result of this comparison at step S3. The lower limit voltage $V_{AL}$ is a lower limit voltage value capable of suitably driving the load 4 of the start-up system at the start time of the engine, and it is set to 11 V, for example. If $V_{B1} < V_{AL}$, the charging controller 7 supplies a control signal for causing the first switch means 61 to perform a switching operation at a fixed ON duty D1 of 80–100%, for example, from the first switch control terminal 74 to a control terminal of the first switch means 61 at step S5.

Figure 3:
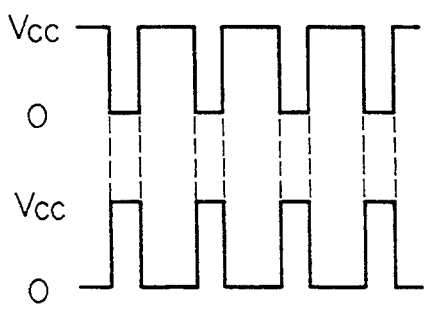
FIG. 3 is a signal waveform diagram showing an on-duty relation between the first and second switch means.

Here, the fixed ON-duty D1 is determined depending upon a difference in capacity between the first battery 2 and the second battery 3. Especially, if the first battery 2 has a large capacity and requires a long charging time, the fixed ON-duty D1 is set to a large value. Further, this fixed ON-duty D1 may be set depending upon a difference between the voltage $V_{B1}$ of the first battery 2 and the voltage $V_{B2}$ of the second battery 3. If this difference is large, the fixed ON-duty may be fixed to a large value. Further, it may be the case that, after having set the fixed ON-duty D1 when the state $V_{B1} < V_{AL}$ has been detected, the fixed ON-duty D1 may continue to be set to a fixed value without being changed until the state $V_{B1} \geq V_{AL}$ is detected. On the other hand, the charging controller 7 supplies a control signal, which causes the second switch means 62 to perform in a switching operation at a fixed ON-duty D2 of 1-D1 as shown in FIG. 3, to a control terminal of the second switch means 62. At step S6, the charging controller 7 supplies the voltage $V_{B1}$ of the first battery 2 from the low voltage output terminal 73 of the charging controller 7 to the inversion input terminal of the comparator 82 in the power generation control means 8.

If it is determined in step S3 $V_{B1} \geq V_{AL}$, the charging controller 7 sets the ON-duty D1 of the first switch means 61 to 50–100% at step S7. At step S8, the charging controller 7 supplies the voltage $V_{B1}$ of the first battery 2 from the low voltage output terminal 73 of the charging controller 7 to the inversion input terminal of the comparator 82 in the power generation control means 8. In the above-described step S7, the ON-duty D1 is determined according to a difference between the voltage $V_{B1}$ of the first battery 2 and the voltage $V_{B2}$ of the second battery 3, and it is made variable unlike the fixed ON-duty D1 in the above-described step S5. That is to say, the ON-duty D1 always changes between 50% and 100% according to a difference between the voltage $V_{B1}$ of the first battery 2 and the voltage $V_{B2}$ of the second battery 3 until the state of $V_{B1} \geq V_{AL}$ and $V_{B1} \leq V_{B2}$ changes to the state of $V_{B1} \geq V_{AL}$ and $V_{B1} > V_{B2}$. For example, it is assumed that the ON-duty D1 is set so that D1=70% (and therefore, D2=30%) holds, when the voltage $V_{B1}$ of the first battery 2=12 V and the voltage $V_{B2}$ of the second battery 3=13 V, whereby the first and second batteries 2 and 3 are charged so that the relations of the voltage $V_{B1}$ of the first battery 2=13 V and the voltage $V_{B2}$ of the second battery 3=13.5 V hold. Then, the ON-duty is set this time so that D1=60% (D2=40%) holds. Further, assuming that the first and second batteries 2 and 3 are charged so that the voltage $V_{B1}$ of the first battery 2 = the voltage $V_{B2}$ of the second battery 3 = 13.8 V holds, the ON-duty is set so that D1 = 50% (D2 = 50%) holds.

If it is determined in step S2 that $V_{B1} > V_{B2}$, the voltage $V_{B1}$ of the first battery 2 is compared with the lower limit voltage $V_{AL}$, and a decision is made based on a result of this comparison at step S4. If $V_{B1} < V_{AL}$, the charging controller 7 causes the first switch means 61 to perform a switching operation at a fixed ON-duty D1 (80–100%) at step S9, in the same way as the above-described step S5. The ON-duty of the second switch means 62 is set to 1-D1. Then, in step S10, the charging controller 7 supplies the voltage $V_{B2}$ of the second battery 3 from the low voltage output terminal 73 thereof to the inversion input terminal of the comparator 82 in the power generation control means 8.

If $V_{B1} > V_{AL}$ results from a decision made in the above-described step S4, the charging controller 7 causes the second switch means 62 to perform a switching operation at a variable ON-duty D2 depending on the voltage difference of 50–100% at step S11. The ON-duty D1 of the first switch means 61 is set to 1-D2. At step S12, the charging controller 7 then supplies the voltage $V_{B2}$ of the second battery 3 from the low voltage output terminal 73 thereof to the inversion input terminal of the comparator 82 in the power generation control means 8.

As described heretofore, the power generation control means 8 operates so that the third switch means 81 controls a current flowing through the field winding 12 of the a.c. generator 1 on the basis of a lower one of the voltages $V_{B1}$ and $V_{B2}$ of the first battery 2 and the second battery 3, respectively. On the other hand, the charging controller 7 controls the first and second switch means so that any one of the first battery 2 and the second battery 3 having a lower voltage may be charged with priority. Therefore, the first battery 2 and the second battery 3 are charged so that neither of them may be overcharged (overdischarged) but rather so that they may be equally charged to have the first predetermined voltage Vref. When the voltage $V_{B1}$ of the first battery 2, to which the load 4 of the start-up system is connected does not exceed the limit voltage $V_{AL}$, the charging current supplied to the first battery 2 is controlled so as to become larger than the charging current supplied to the second battery 3 as much as possible, irrespective of whether the voltage $V_{B1}$ of the first battery 2 is larger than the voltage $V_{B2}$ of the second battery 3 or not. Therefore, the voltage of the first battery 2 can be rapidly recovered and it is possible to always keep the first battery 2 charged in a good state so as not to cause a trouble at the start time of the engine.

In the above-described steps S5 and S9, the ON-duties of both switch means are set when the state of $V_{B1} < V_{AL}$ is detected and the ON-duties are fixed until the state of $V_{B1} > V_{AL}$ is detected. This aims at expediting recovery of the voltage of the first battery 2. The ON-duty setting is not necessarily restricted to this manner, but it may be made variable as in steps S7 and S11. However, the ON-duties of both switch means may also be fixed in steps S7 and S11. In this case, all ON-duties of switch means become fixed and hence the ON-duty change control becomes unnecessary and the configuration of the charging controller 7 can be advantageously simplified accordingly. In the step S11 of the flow chart shown in FIG. 2, for example, the ON-duty of the second switch means 62 would be changed from 50–100% (variable) to 80–100% (fixed).

Figure 4:
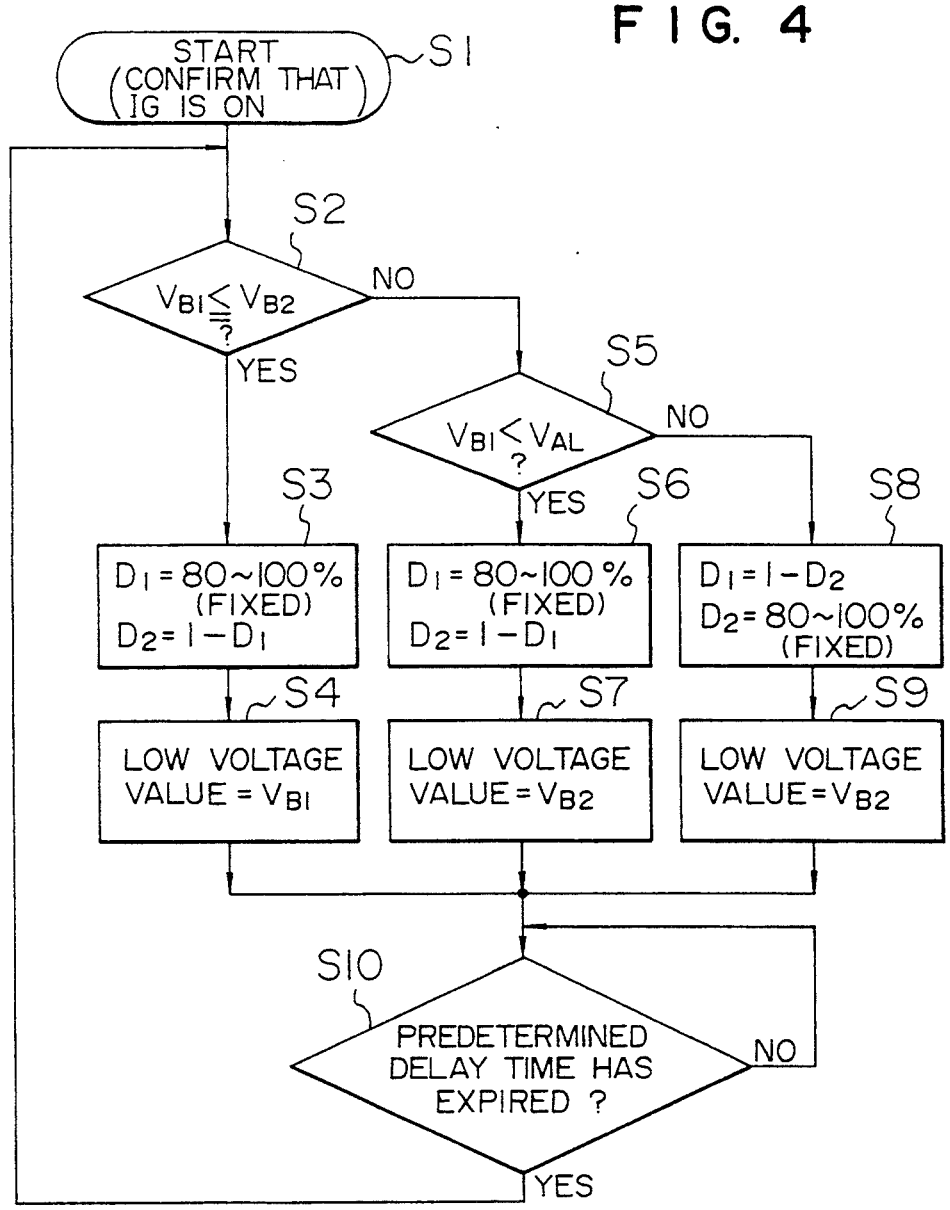
FIG. 4 is a flow chart showing the other processing conducted by charging controller 7 of the above-described first embodiment.

FIG. 4 is a flow chart showing another example of a control operation exercised by the charging controller 7.

If it is determined that the IG switch is set to ON in step S1, the voltage $V_{B1}$ and $V_{B2}$ of the first battery 2 and the second battery 3, respectively, are compared with each other and a decision is made in step S2. If $V_{B1} \leq V_{B2}$, the ON-duty D1 of the first switch means 61 is set to 80–100% (fixed), for example, in step S3. As described above, this ON-duty D1 may be made to have a value set beforehand depending on the capacities of the first battery 2 and the second battery 3, or may be set depending on a voltage difference between the first battery 2 and the second battery 3. The ON-duty D2 of the second switch means 62 is set to 1-D1 (fixed). Then, at step S4, the charging controller 7 supplies the voltage $V_{B1}$ of the first battery 2 from the low voltage output terminal 73 to the inversion input terminal of the comparator 82 in the power generation control means 8. Step 10 provides a delay time for increasing the control period. Steps S5 to S9 can be understood based on the above discussion and the descriptions of those steps are therefore omitted.

When the voltage $V_{B1}$ of the first battery 2 is smaller than the voltage $V_{B1}$ of the second battery 3, it becomes possible by this control to always make the charging current supplied to the first battery 2 as much larger than that to the second battery 3 as is possible. In this way, the charging state of the first battery 2 can be kept in a desirable state with higher reliability.

Further, in the configuration shown in FIG. 1, relays may be used as the first and second switch means. In this case, the third switch means 81 is made to have a control terminal, and a switch cut-off means for outputting a control signal to the control terminal of the third switch means 81 so as to forcibly cut off the third switch means 81 is provided in the charging controller 7.

An operation of the charging controller 7 will be described by referring to the flow chart shown in FIG. 4. It is assumed that the ON-duty D1 of the first switch means 61 in steps S3 and S6 of this flow chart is 100% and the ON-duty D2 of the second switch means 62 in step S8 is 100%. If it is decided at step S2 that $V_{B1} \leq V_{B2}$, the charging controller 7 turns on only the first switch means 61 at step S3 and supplies the voltage $V_{B1}$ of the first battery 2 to the power generation control means 8 in step S4. Therefore, until it is decided at step S2 that $V_{B1} > V_{B2}$, only the first battery 2 is charged. If it is decided thereafter at step S2 that $V_{B1} > V_{B2}$, the voltage $V_{B1}$ of the first battery 2 is compared with the lower limit voltage $V_{AL}$ so that a decision is made at step S5. If $V_{B1} < V_{AL}$, only the first switch means 61 is turned on, and only the first battery 2 is charged until it is decided at step S5 that $V_{B1} \geq V_{AL}$. If it is decided at step S5 that $V_{B1} \geq V_{AL}$, only the second switch means 62 is turned on at step S8.

That is to say, conduction and cutoff of the first switch means 61 and the second switch means 62 are changed over depending on whether the voltage of the first battery 2 is larger than the voltage of the second battery 3, whereby the voltages of these batteries are controlled to be equal to the first reference voltage Vref. Since relays are used as the switch means, if the first and second switch means are opened and closed while the generator 1 is in operation, there occurs a problem that contacts are affected by the interruption of the charging current. Therefore, switch cut-off means is provided to turn off the third switch means 81 so as to cut off a field current when the first and second switch means 61 and 62 operate to be opened and closed. Instead of providing the switch cut-off means, a voltage higher than the first predetermined voltage Vref may be outputted from the low voltage output terminal 73 of the charging controller 7 so as to cut off a field current when the first and second switch means 61 and 62 operate to be opened and closed.

Since relays are used as the first and second switch means as described above, a large loss caused by the use of semiconductor power devices having a control terminal can be avoided, and a drop in the charging voltage can be prevented. Further, only in a case where the voltage of the first battery 2 becomes low and the voltage of the second battery 3 is high due to expiration of the life of the first battery 2, for example, the first and second switch means may be simultaneously turned on so as to also use the second battery 3 at the start time of the engine.

Figure 5:
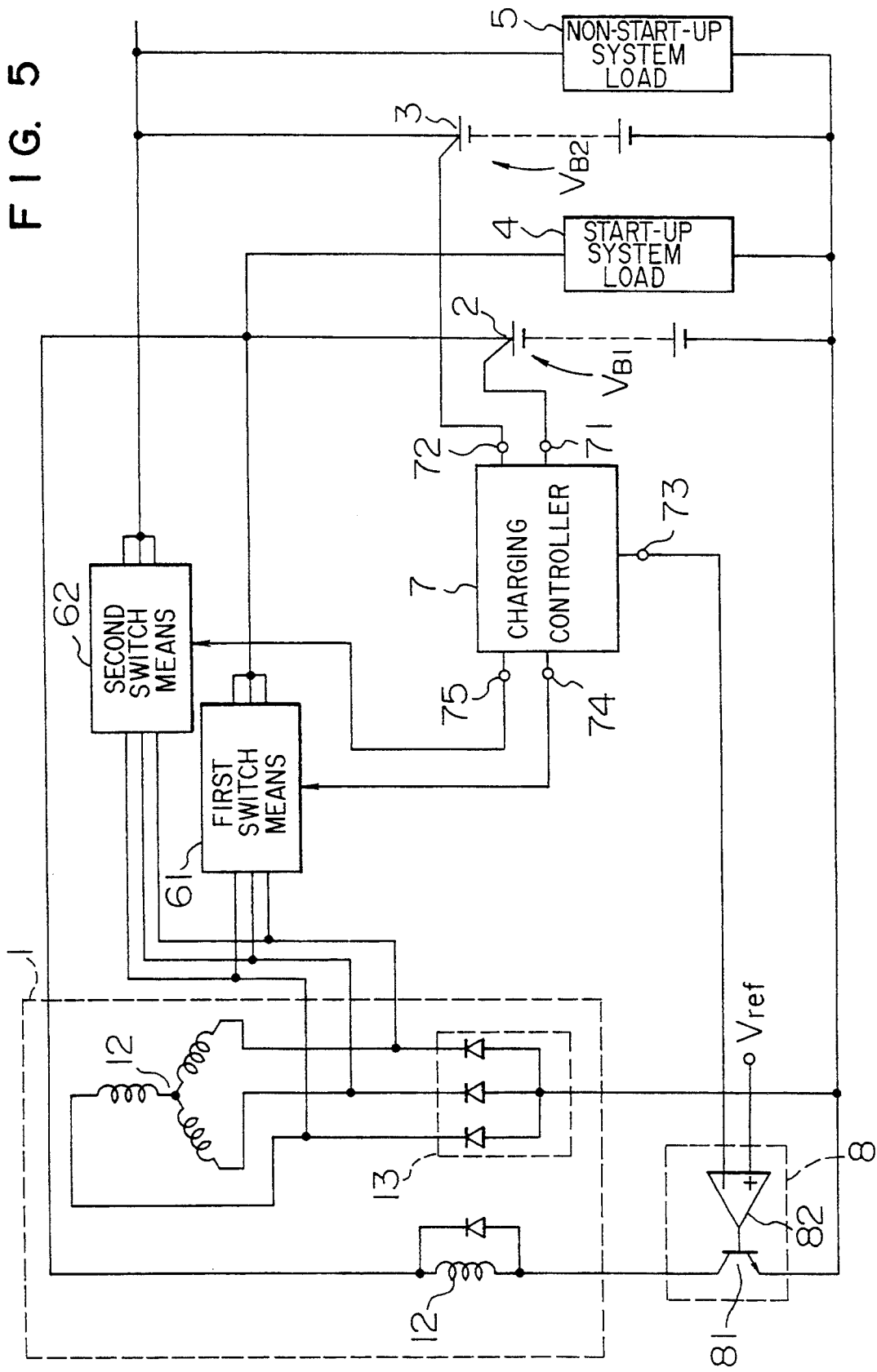
FIG. 5 is an overall configuration diagram showing a second embodiment of a power source apparatus for vehicles according to the present invention.

A second embodiment will be described hereafter by referring to FIG. 5. Numerals shown in FIG. 5 correspond to those shown in FIG. 1 representing the first embodiment.

This embodiment differs from the first embodiment in that the first and second switch means 61 and 62 are provided with a rectifying function. As shown in FIG. 5, a rectifier set 13 of the generator 1 includes only a lower level diode bridge having anodes connected in common. The first and second switch means 61 and 62 are connected to cathodes of the respective diodes of the rectifier set 13.

Figure 6:
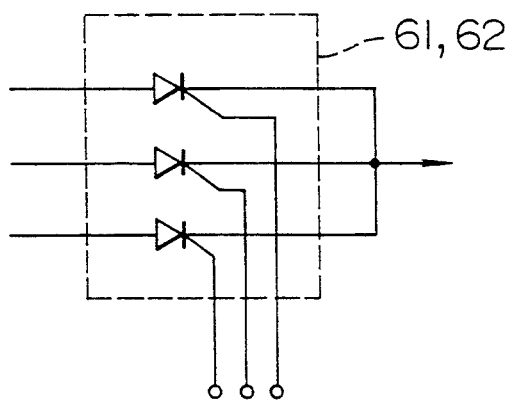
FIG. 6 is a circuit diagram showing an example of the first and second switch means of the above-described second embodiment.

FIG. 6 shows an example of the configuration of the first and second switch means 61 and 62 according to the second embodiment. This switch means has three thyristors. Anodes of the respective thyristors are connected to the cathodes of the respective diodes of the rectifier set 13. Gates of the respective thyristors of the first switch means 61 are connected to the switch control terminal 74 of the charging controller 7. Gates of the respective thyristors of the second switch means 62 are connected to the switch control terminal 75 of the charging controller 7. As described above with reference to the first embodiment, each thyristor is subjected to ON/OFF control by the charging controller 7.

The first and second switching means 61 and 62 of the second embodiment are configured in a manner that the higher level side diode bridge shown in the first embodiment and the first or second switch means are united in a body, thereby resulting in a reduction of power loss.

Figure 7:
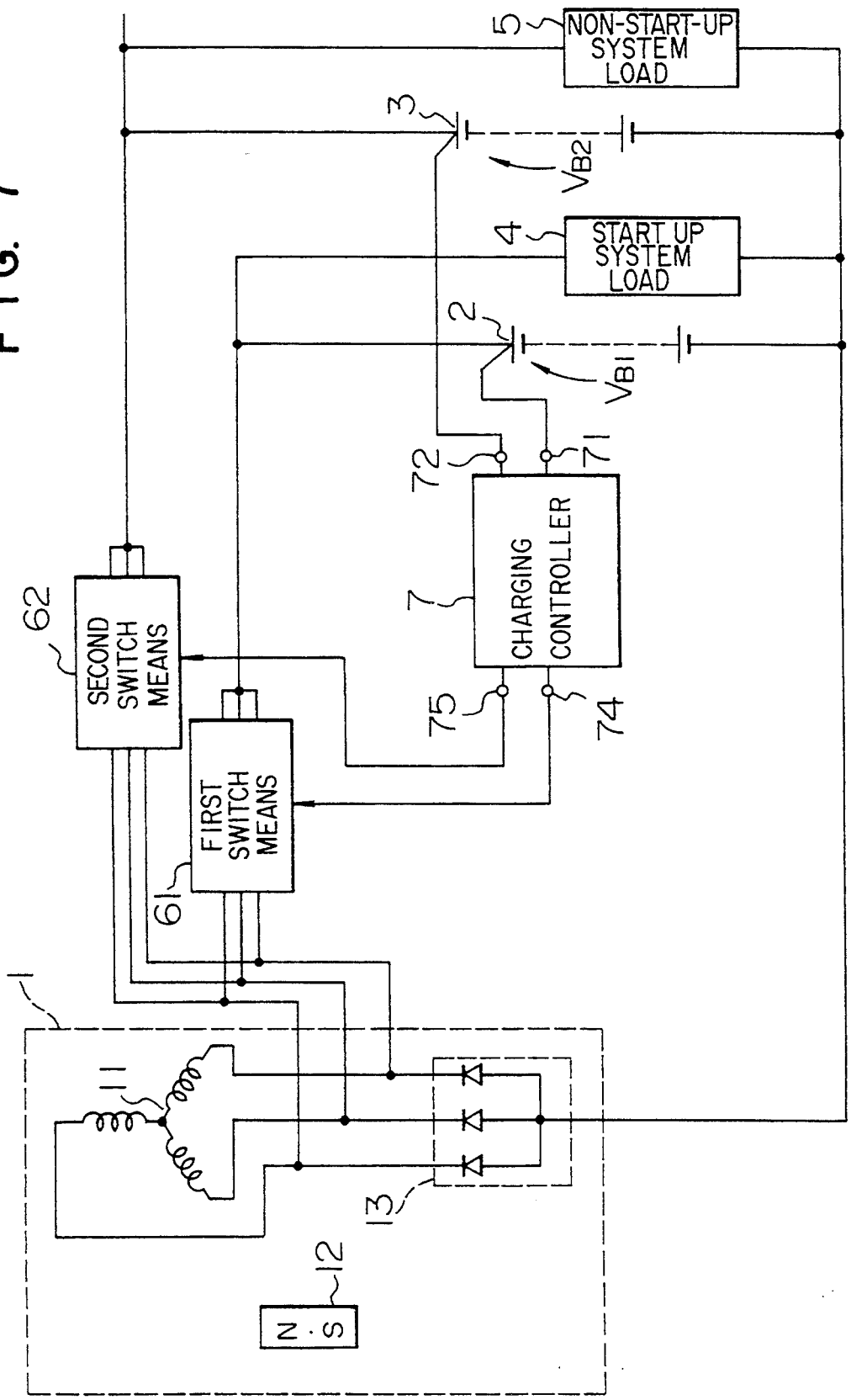
FIG. 7 is an overall configuration diagram showing a third embodiment of a power source apparatus for vehicles according to the present invention.

A third embodiment will hereafter be described by referring to FIG. 7. Numerals in FIG. 7 correspond to those shown in FIGS. 1 and 5, which respectively show the first and second embodiments.

The present embodiment differs from the first and second embodiments in that the rotor of the a.c. generator 1 is formed of a permanent magnet 12. If the rotor is formed of a permanent magnet, power generation control of the a.c. generator 1 cannot be exercised by adjusting the value of a current flowing through the field winding 12 by means of the power generation control means 8, as can be done in the first and second embodiments. When the engine is driven, the a.c. generator 1 always continues to generate electric power. Therefore, the charging controller is configured so that, when the voltage $V_{B1}$ of the first battery 2 or the voltage $V_{B2}$ of the second battery 3 exceeds a first predetermined voltage Vref or a third predetermined voltage (upper limit voltage) which is higher than the first predetermined voltage Vref, switch means for controlling a charging current of the battery, whose voltage has exceeded one of the predetermined voltages as described above, may be turned off. By doing so, it becomes possible to prevent the battery from becoming overcharged. In a case where voltages of both the first and second batteries exceed the upper limit voltage, the generator 1 is put into a no-load power generation state, and the voltage at the output terminal thereof becomes a high voltage. When the voltage of either one of the first battery and the second battery becomes lower than the upper limit voltage, however, charging of the battery having the lower voltage is restarted and hence the voltage of the output terminal of the a.c. generator 1 returns to the predetermined voltage again.

In the power source apparatus according to the present invention, its load side is divided into two systems, i.e., the load and battery of the start-up system and the load and battery of the non-start-up system as heretofore described. Further, the power source apparatus has charging control means. The charging control means detects voltages of both batteries. The charging control means, set up so as to give priority to charging the battery of the start-up system, controls the operation of two switch means respectively for switching the charging of the two systems. As a result, the following effects can be obtained.

A single three-phase a.c. generator of the typical voltage generation type is capable of supplying currents to two batteries, i.e., a battery of start-up system and a battery of non-start-up system in parallel. In addition, the battery for start-up is charged with priority by setting a lower limit voltage. Further, by the control of the charging voltage, overcharge or over-discharge is prevented and a stable engine starting operation is always made possible.

We claim:

1. A power source apparatus for vehicles comprising:
a first battery in a circuit for a start-up system used for driving a starter motor, and a second battery;
an alternating current generator for vehicles, for charging said first and second batteries; and
charging control means for detecting voltages of said first and second batteries, and comparing a drop of a voltage of said first battery with a drop of a voltage of said second battery, and controlling a duty factor of a charging current flowing from said generator to one of said batteries having a voltage drop larger than that of the other battery so as to equally charge said first and second batteries, said charging control means including means for charging said first battery with priority when the voltage of said first battery is lower than a lower limit voltage set beforehand,
wherein said first and second batteries have equal open terminal voltages, and said charging control means compares voltages of said first and second batteries with each other and exercises control so that the battery having a lower voltage may be charged with priority except when the voltage of said first battery is lower than a lower limit voltage set beforehand.

2. A power source apparatus for vehicles comprising:
an alternating current generator having an armature winding and a field winding, said alternating current generator converting an alternating current output produced by said armature winding into a direct current output by means of rectification means and delivering said direct current output;

first and second batteries having equal open terminal voltages;

first switch means connected between said first battery and said rectification means to control a current flowing from said rectification means to said first battery;

second switch means connected between said second battery and said rectification means to control a current flowing from said rectification means to said second battery;

battery voltage measuring means for measuring the values of voltages of said first and second batteries;

power generation control means for controlling a current flowing through said field winding of said generator in response to the values measured by said battery voltage measuring means to adjust the direct current output of said generator, said power generation control means comprising third switch means for causing a current to flow through said field winding of said generator so as to keep a lower one of the voltages of said first and second batteries at a first predetermined voltage higher than the lower limit voltage; and charging control means for controlling a first duty factor of said first switch means and a second duty factor of said second switch means in response to voltage drops of said first and second batteries to adjust charging currents supplied to said first and second batteries, said charging control means comparing voltages of said first and second batteries with each other and exercising control so that a battery having a lower voltage may be charged with priority except when the voltage of said first battery is lower than a lower limit voltage set beforehand.

3. A power source apparatus for vehicles according to claim 2, wherein said first battery comprises a battery of a start-up system used for driving a starter motor, and said charging control means exercises control so that said first battery may be charged with priority when the voltage of said first battery is lower than a lower limit voltage set beforehand.

4. A power source apparatus for vehicles comprising:

an alternating current generator comprising a rotor formed of a permanent magnet, said alternating current generator converting an alternating current output produced by an armature winding by the use of a magnetic flux generated from said permanent magnet into a direct current output by means of rectification means and outputting the direct current output;

first and second batteries, said first battery comprising a battery of a start-up system used for driving a starter motor and said first and second batteries having equal open terminal voltages;

first switch means connected between said first battery and said rectification means to control a current flowing from said rectification means to said first battery;

second switch means connected between said second battery and said rectification means to control a current flowing from said rectification means to said second battery; and charging control means for switching conduction and cutoff of said first and second switch means in response to voltage drops of said first and second batteries and for exercising control so as to supply a charging current variably to said first and second batteries, said charging control means exercising control so that said first battery may be charged with priority when the voltage of said first battery is lower than a lower limit voltage set beforehand, and said charging control means comparing voltages of said first and second batteries with each other and exercising control so that the battery having a lower voltage may be charged with priority except when the voltage of said first battery is lower than a lower limit voltage set beforehand, and said charging control means exercising control so as to cut off both the first and second switch means when both voltages of said first and second batteries exceed an upper limit voltage set beforehand.

* * * * *